United States Patent [19]
Alves et al.

[11] Patent Number: 5,642,196
[45] Date of Patent: Jun. 24, 1997

[54] METHOD AND APPARATUS FOR MEASURING THE THICKNESS OF A FILM USING LOW COHERENCE REFLECTOMETRY

[75] Inventors: Ronald V. Alves, Palo Alto; Wayne V. Sorin, Mountain View; Steven A. Newton, Belmont, all of Calif.

[73] Assignee: Hewlett-Packard Company, Palo Alto, Calif.

[21] Appl. No.: 520,199

[22] Filed: Aug. 28, 1995

[51] Int. Cl.⁶ .............................. G01B 9/02; G01B 11/06
[52] U.S. Cl. .......................... 356/381; 356/382; 356/357
[58] Field of Search ................................ 356/357, 355, 356/381, 382, 345

[56] References Cited

U.S. PATENT DOCUMENTS 5,323,229  6/1994  May et al. ........................... 356/357

*Primary Examiner*—Frank G. Font
*Assistant Examiner*—Amanda Merlino

[57] ABSTRACT

An apparatus and method for measuring the thickness of a film having top and bottom surfaces. The apparatus includes a first coupler for generating a first probe light signal and a second probe light signal from a low coherence light source. The first probe light signal is directed toward the top surface of the film and the light leaving the top surface of the film is collected. Similarly, the second probe light signal is directed toward the bottom surface of the film and the light leaving the bottom surface of the film is also collected. Top and bottom partially reflecting reference surfaces are provided for generating reflections. The top reference surface reflects part of the light leaving the top surface back toward the top surface, and the bottom reference surface reflects light leaving the bottom surface of the film back toward the bottom surface of the film. The collected light is combined to form a collected light signal which is input to a receiver that determines the time delay between light reflected from the top surface of the film and the top reference surface and between the bottom surface of the film and the bottom reference surface. In the preferred embodiment of the present invention, the receiver is constructed from an optical autocorrelator or an optical spectrum analyzer that includes circuitry for providing the Fourier transform of the frequency domain spectrum measured from the collected light signal.

18 Claims, 6 Drawing Sheets

METHOD AND APPARATUS FOR MEASURING THE THICKNESS OF A FILM USING LOW COHERENCE REFLECTOMETRY

FIELD OF THE INVENTION

The present invention relates to optical reflectometry, and more particularly, to an apparatus for measuring the thickness of an opaque film, web, or sheet.

BACKGROUND OF THE INVENTION

In many industrial processes, control of film thickness is of critical importance. For the purposes of this discussion, the term "film" shall be used to denote a film, web, or sheet.

For example, the manufacture of photographic film requires the generation of a uniform layer of emulsion on a backing. From the point of view of process control, it is advantageous to be able to measure the film thickness during the film generation process rather than measuring the film in a quality control laboratory after the film has been manufactured. If samples are measured off-line, correction of any machinery malfunction cannot be performed until after a considerable volume of defective film has been processed. This leads to waste.

Prior art techniques for measuring film thickness may be divided into contact and non-contact methods. In one contact technique, a micrometer that comes in physical contact with both sides of the film is employed. These techniques have the disadvantage of physically deforming the film during the measurement. In addition, these techniques are difficult to apply for the on-line measurement of fast moving film webs.

Non-contact techniques based on the attenuation of a beam of atomic particles or radiation such as beta particles or gamma rays are also known to the prior art. For example, the attenuation of a beam of electrons by the film is used to determine the film thickness in one prior art method of this type. This methodology has two disadvantages. First, the system must be calibrated for each type of film, since the attenuation depends on the chemical composition and density of the film. Second, the system typically relies on a radioactive source to generate the particle beam. It is generally desirable to limit the use of radioactive material for cost, safety, and psychological reasons.

Methods for measuring the thickness of films using an optical autocorrelator are known also known to prior art. For the purposes of this discussion, an optical autocorrelator is defined to be an interferometer having a variable differential time delay. One embodiment of an optical autocorrelator is described, for example, in chapter 5 of *Statistical Optics*, by Joseph W. Goodman (John Wiley & Sons, 1985, pp. 157–170). Those skilled in the art are aware of the principles of operation of an optical autocorrelator, but certain principles will be clarified here because of their relevance to this patent. In an autocorrelating interferometer wherein light is split into two different paths and then recombined and directed to a photodiode, the detected light intensity is measured as a function of a parameter. This parameter can be the differential optical path length $\alpha L$ of the interferometer or it can be the differential time delay $\alpha t$ of the interferometer. These parameters are related by $\alpha L = n \, c \, \alpha t$, where c is the speed of light in vacuum and n is the group index of the medium (usually air) of the differential optical path. The detected light intensity expressed as a function of the differential time delay is called the coherence function of the input light. Hence, a receiver which determines the time delay between light reflected from different surfaces of a film performs the same function as a receiver which determines the path delay between light reflected from different surfaces of a film. Determining the spacing between peaks in the coherence function of the reflected light is yet another way to describe the same function.

A Michelson interferometer is an example of such an autocorrelator. An example of an apparatus for measuring film thickness which utilizes a Michelson interferometer is taught in U.S. Pat. 3,319,515 to Flournoy. In this system, the film is illuminated with a collimated light beam at an angle with respect to the surface of the film. The front and back surfaces of the film generate reflected light signals. The distance between the two reflecting surfaces is then determined by examining the peaks in the autocorrelation spectrum generated in a Michelson interferometer that receives the reflected light as its input. Unfortunately, this method can determine only the product of the group index of refraction and the film thickness. If a variation is detected in this quantity, additional measurements must be made to determine if the film composition has changed or the thickness has changed. The group index is defined to be the ratio of the propagation velocity of a light pulse in the medium relative to the velocity of propagation of the pulse in a vacuum.

Broadly, it is the object of the present invention to provide an improved apparatus and method for measuring the thickness of a film, sheet or web film.

It is a further object of the present invention to provide a system that does not require contact between the film and the measuring device.

It is a still further object of the present invention to provide a system that can accommodate flutter in the film.

It is yet another object of the present invention to provide a system that can determine both the group index and the film thickness when transparent films are measured.

These and other objects of the present invention will become apparent to those skilled in the art from the following detailed description of various embodiments of the invention and the accompanying drawings.

SUMMARY OF THE INVENTION

The present invention comprises an apparatus and method for measuring the thickness of a film having top and bottom surfaces. The apparatus includes a first coupler for generating a first probe light signal and a second probe light signal from a low coherence light source. The first probe light signal is directed toward the top surface of the film and the light leaving the top surface of the film is collected. Similarly, the second probe light signal is directed toward the bottom surface of the film and the light leaving the bottom surface of the film is also collected. Top and bottom partially reflecting reference surfaces are provided for generating reflections. The top reference surface reflects part of the light leaving the top surface back toward the top surface, and the bottom reference surface reflects light leaving the bottom surface of the film back toward the bottom surface of the film. The collected light is combined to form a collected light signal which is input to a receiver that determines the time delay between light reflected from the top surface of the film and the top reference surface and between the bottom surface of the film and the bottom reference surface. In the preferred embodiment of the present invention, the receiver is constructed from an optical autocorrelator or an optical spectrum analyzer that includes circuitry for providing the Fourier transform of the frequency domain spectrum measured from the collected light signal.

DETAILED DESCRIPTION OF THE INVENTION

Figure 1:
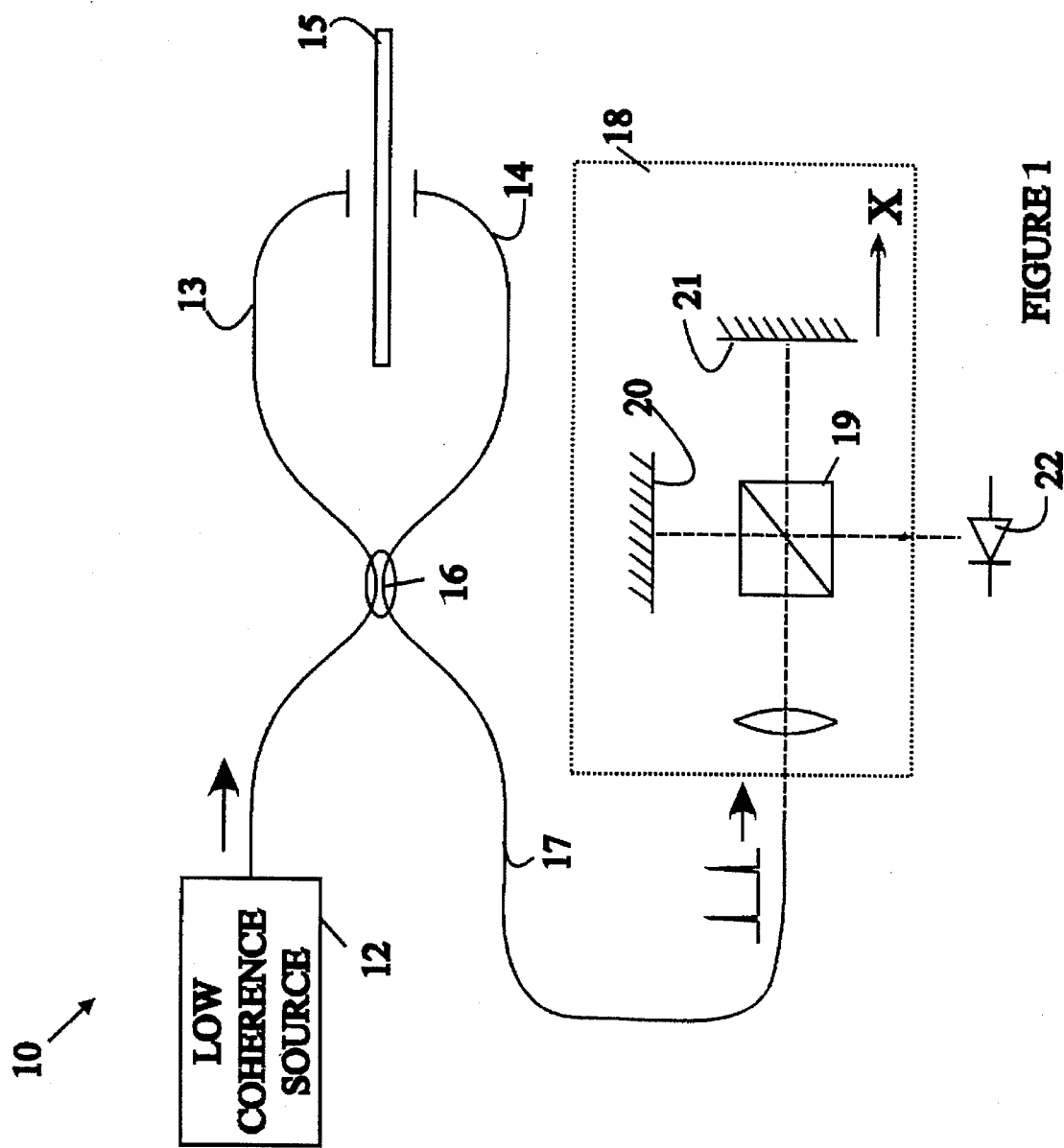
FIG. 1 is a schematic drawing of an embodiment of a thickness measuring apparatus according to the present invention.

The method by which the present invention attains its advantages over the prior art may be more easily understood with reference to FIG. 1 which is a schematic drawing of an embodiment of a thickness measuring apparatus 10 according to the present invention. Apparatus 10 utilizes a low coherence light source 12 to generate a light signal that is split by a 3 dB coupler 16 into two light signals that are applied to the opposite surfaces of a film 15 whose thickness is to be measured. The light signals are applied via fibers 13 and 14. The light reflected from the two surfaces of film 15 is collected by fibers 13 and 14 and combined by coupler 16 to provide an output light signal on fiber 17 which is sent to a receiver which is preferably an autocorrelator.

The length of optical fibers 13 and 14 need not be equal. In fact, the lengths of these optical fibers is preferably different for reasons discussed in more detail below.

The coherence length of light source 12 must be small compared to the thickness of the film 15 being measured. Such light sources are common in the optical reflectometry arts, and hence, will not be discussed in detail here. For the purposes of the present discussion, it is sufficient to note that an edge emitting light emitting diode may be utilized for light source 12.

An exemplary autocorrelator constructed from a Michelson interferometer is shown at 18. The light incident on the Michelson interferometer is split into two beams that traverse different paths by beam splitter 19. The first path is determined by the position of fixed mirror 20 and the second by moveable mirror 21. After traversing the different paths, the light from the two beams is recombined by splitter 19 and directed to a photodiode 22 which measures the intensity of the light which varies with the position of mirror 21 due to the interference of the light. The output of photodiode 22 forms the output of autocorrelator 18.

Figure 3:
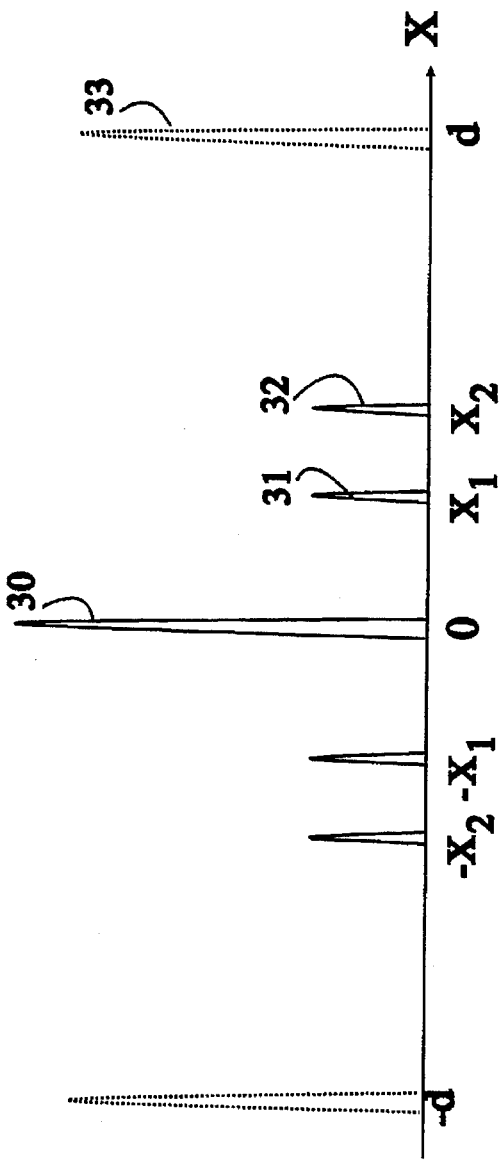
FIG. 3 illustrates the output generated by an autocorrelation receiver when used in the present invention to measure an opaque film.
Figure 2:
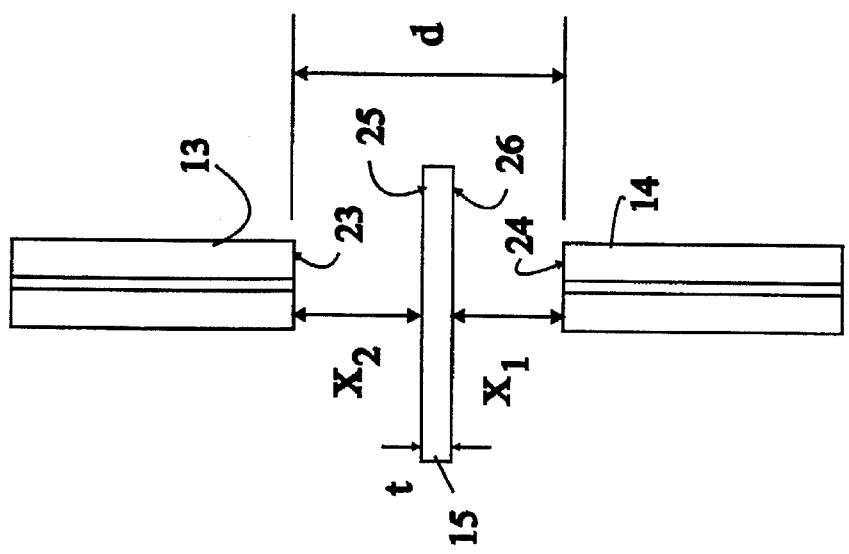
FIG. 2 is an expanded view of the ends of fibers 13 and 14 and film 15 shown in FIG. 1.

Refer now to FIGS. 2 and 3. FIG. 2 is an expanded view of the ends of fibers 13 and 14 and film 15 showing various distances associated with the film and the fiber ends. The thickness, t, of film 15 is equal to $(d-x_1-x_2)$. The relative values of d, $x_1$, and $x_2$ are obtained from the autocorrelator output. The value of d is obtained from direct measurements made when the film is absent.

FIG. 3 illustrates the output of autocorrelator 18. The large signal shown at 30 for x=0 is always present since any signal pattern input into the autocorrelator will always be correlated with itself. When no film is present, a peak will appear at x=d, the distance between the fiber ends. Such a peak is shown at 33. This distance is used in calibrating the apparatus based on the value obtained by direct measurement of the distance between the fiber ends. When a film is inserted into apparatus 10, two additional peaks appear at $x=x_1$ and $x=x_2$ as shown at 31 and 32, respectively. The peak at $x_1$ corresponds to the reflections from surface 26 and fiber end 14. The peak at $x_2$ corresponds to the reflections from surface 25 and fiber end 13. In this embodiment of the present invention, the fiber ends are polished and provide partially reflecting reference surfaces as shown at 23 and 24. Alternately, a partially reflecting reference reflector can be placed between each fiber end and the corresponding surface of the film being measured. The reference reflector can be the surface of a lens, as explained below, or an optically clear material having a partially reflecting surface. A symmetric peak pattern is also observed for negative x values.

Figure 4:
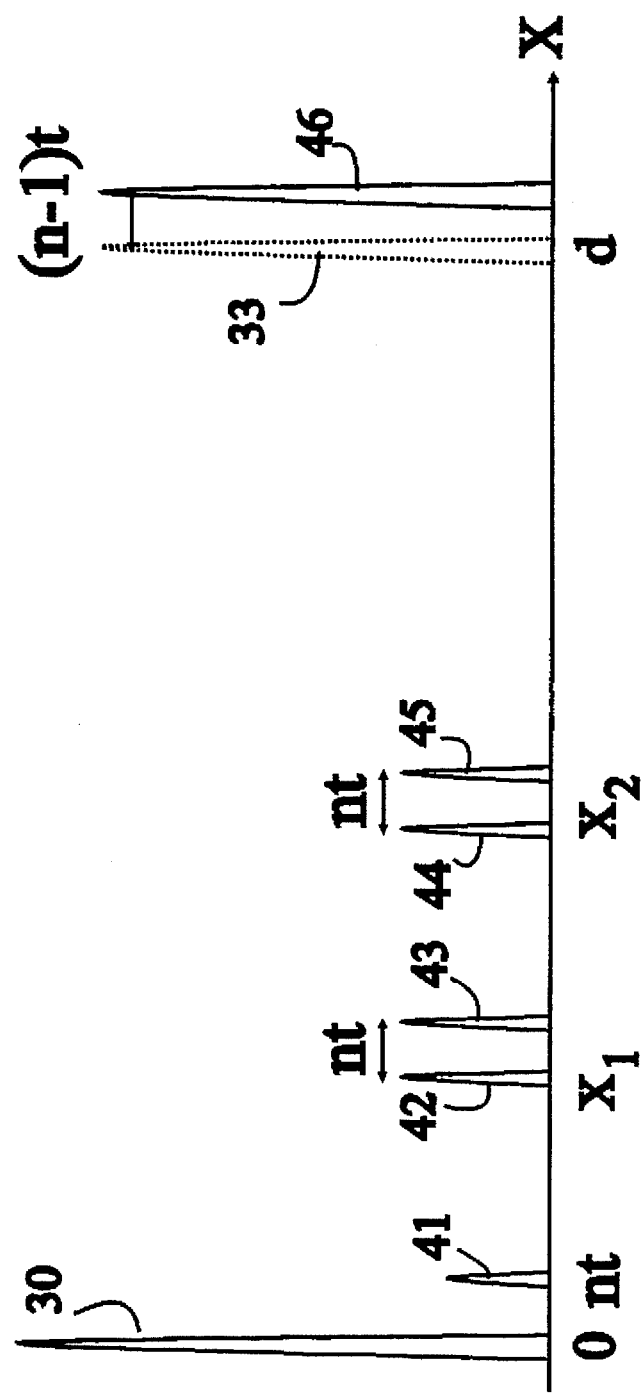
FIG. 4 illustrates the output of the autocorrelator when a transparent film of group index of refraction n is placed between the probe pair.

If the film is sufficiently transparent, the group index, n, can also be obtained. The output of the autocorrelator when film 15 is a transparent with group index n is shown in FIG. 4. To simplify the drawing, the peaks corresponding to negative x values have been omitted. Once again, a peak 30 is located at x=0. In the absence of the film, a peak 33 is present at x=d. When film 15 is inserted, peaks 42 and 44 appear at the locations corresponding to $x_1$ and $x_2$ as in the opaque film case. These peaks are generated by the reflections between the film boundaries and the nearest fiber end. In addition, new peaks, shown at 43 and 45, appear corresponding to the distances $(x_1+nt)$ and $(x_2+nt)$. Here, t is the thickness of film 15. These peaks correspond to reflections from light that penetrates the film at one boundary and is then reflected from the second boundary. Peak 46 is generated by reflections from fiber ends 13 and 14 after the light as passed through film 15. Peak 46 is located at $x=d+(n-1)t$. Finally, there is a small peak at x=nt as shown at 41. It will be apparent to those skilled in the art that the output obtained from the autocorrelator may be used to determine both t and n.

The above described embodiments of the present invention have been described in terms of two fiber ends placed in close proximity to the film. In a preferred embodiment of the present invention, the fiber ends are placed at some distance from the film to provide room for flutter and tolerance for angular variations in the reflective surface of the film that is inherent when the film flutters during rapid motion. To accommodate the added distance and provide the desired tolerance, lenses and reflective surfaces are utilized. The manner in which this arrangement operates may be more easily understood with reference to FIG. 5 which is a cross-sectional view of the fiber ends, lenses, and film under measurement. Light leaving fiber 51 is imaged onto the film with the aid of lens 55 which focuses the light onto the film plane. Light leaving film 53 is focused back into fiber 52 by lens 56. Similarly, light leaving fiber 52 is focused onto film 53 by lens 56, and the light leaving the film plane is focused into fiber 51 by lens 55.

In the above embodiment of the present invention, the surfaces, 58 and 59 of lens 55 and 56, respectively, are coated with a partially reflecting material. In the preferred embodiment of the present invention, these surface reflect approximately 33% of the light incident thereon. These surfaces provide the calibration distance "d" described above. When the film is absent, there will be a peak in the autocorrelator output at a distance equal to the spacing between these lens surfaces. Ideally, the curvature of the front surface of each lens is chosen such that the distance between points on the front surface and the center of the film is constant.

Figure 5:
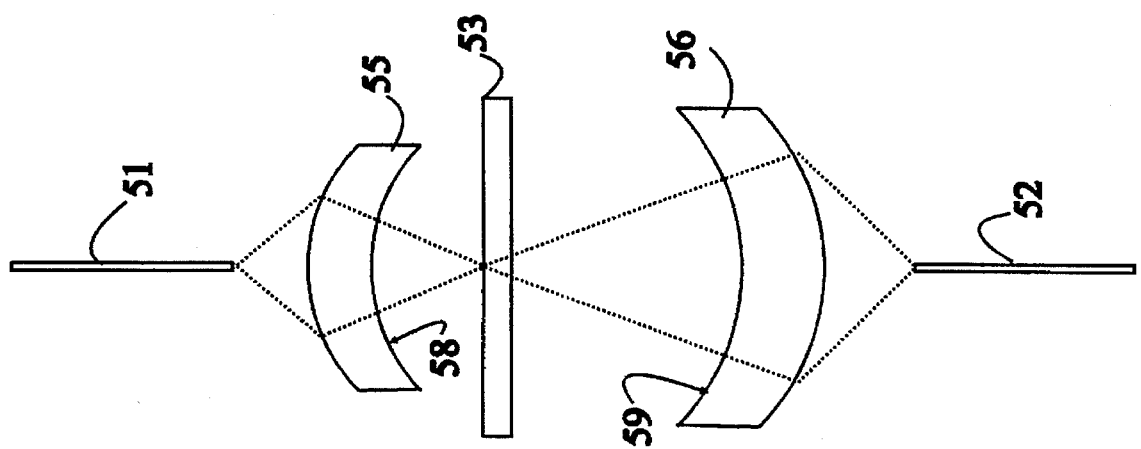
FIG. 5 is a cross-sectional view of the fiber ends and lenses used in the preferred embodiment of the present invention.

As will be seen from FIG. 5, film 15 is preferably placed closer to one of the lenses. In the embodiment shown in FIG. 5, film 15 is placed closer to lens 55. As noted above, the autocorrelation peaks correspond to the distances between the lens surface and the film. If the film is placed exactly halfway between the lenses, the peaks will overlay. This overlap will make the determination of the distances $x_1$ and $x_2$ difficult. Hence, the film is purposely placed off center sufficiently to provide separate peaks for the reflections corresponding to the distances $x_1$ and $x_2$.

Although the above described embodiments of the present invention have utilized a Michelson interferometer as the autocorrelator, other forms of autocorrelator may be utilized. For example, an optical spectrum analyzer which measures the optical power as a function of wavelength or optical frequency can be utilized. The Fourier transform of the frequency domain spectrum from such an analyser provides an output which is identical to that of an autocorrelator.

In some applications, the measurement of the thickness at a number of different locations on the sheet is desired to test for uniformity across the sheet. The present invention can provide such multi-point measurements by inserting additional 3 dB couplers in fibers 13 and 14 shown in FIG. 1 so as to split the signal into additional fibers to be used in constructing additional probe pairs. If the dimensions of each probe pair are chosen to be sufficiently different from the other probe pairs, and the distances from the film to the reference surfaces are likewise chosen to be different, the various probe measurements can be multiplexed onto the same autocorrelator. The additional peaks introduced by the additional probe pairs will be distinct from each other if sufficient differences exist.

Figure 6:
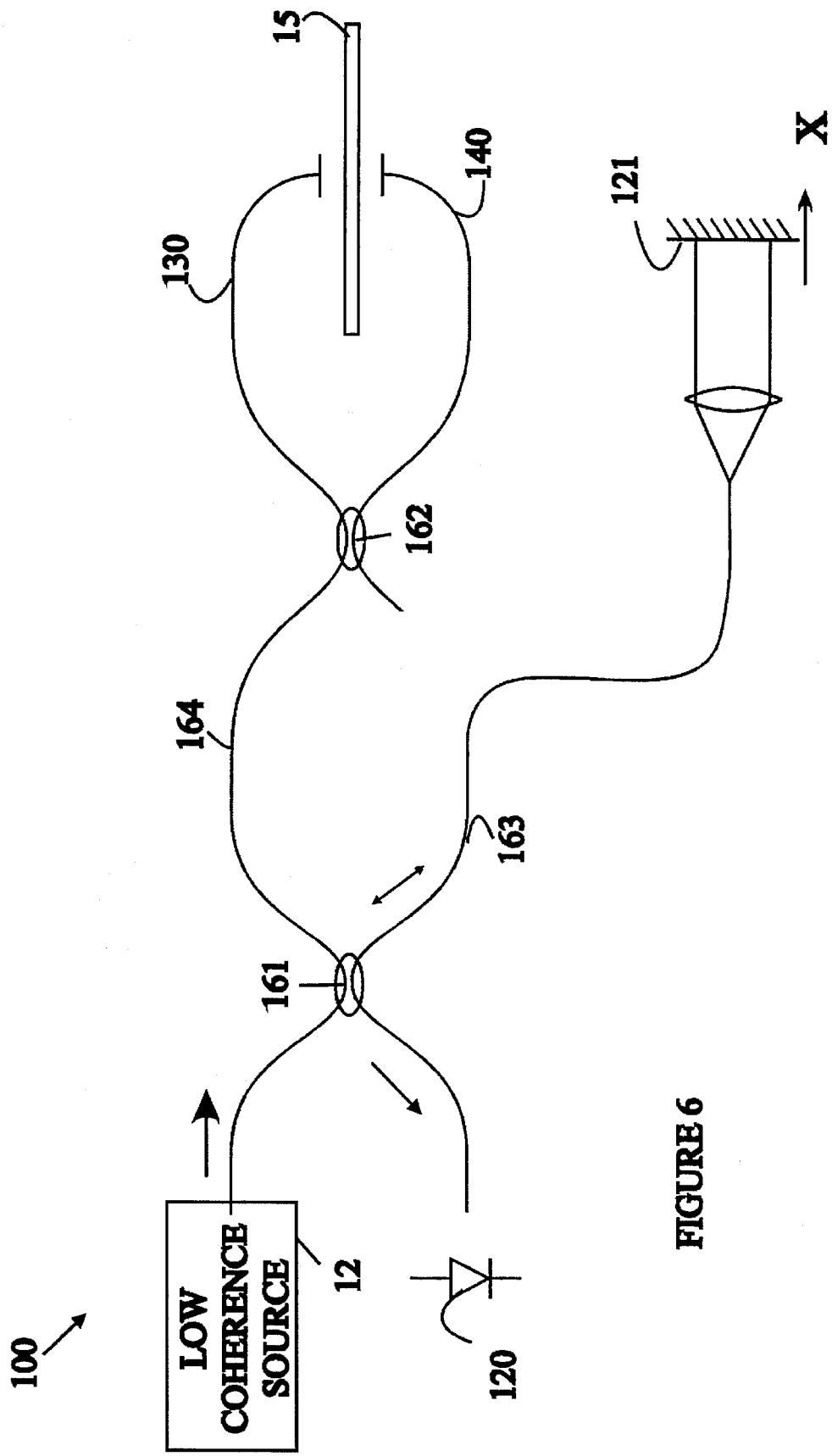
FIG. 6 is a schematic drawing of an embodiment of the present invention utilizing an optical reflectometer for the receiver.

While the above described embodiments of the present invention have utilized an autocorrelator for the receiver, other types of reflectometer receivers may also be utilized. Such an alternate arrangement is shown at 100 in FIG. 6. The light from a low coherence source 12 is split into two light signals by a first coupler 161. The signal on fiber 164 is split into two signals to form a probe pair comprising fibers 130 and 140 which applies these signals to film 15 and collects the light reflected and transmitted by film 15. The light collected is recombined with the second light signal generated by coupler 161 at coupler 161 after the second light signal has traversed a variable reference path comprising moving mirror 121. The signals combined at coupler 161 will undergo constructive interference when the delay in the reference path matches the transit time for the signals returning on fiber 164 of the reflectometer. The intensity of the light leaving coupler 161 is measured by a photodetector 120. This type of receiver may be purchased commercially (Hewlett-Packard Company HP8504 Precision Reflectomer). From the output of photodiode 120 as a function of the mirror position X, the film thickness and group index can be determined as discussed above.

Any type of reflectometer having sufficient spatial resolution to distinguish the film reflections can be used in this configuration. This configuration, however, is not preferred because the results are sensitive to variations in the lengths of the various fibers. Such variations may occur due to temperature fluctuations or mechanical stress. In contrast, the results obtained with an autocorrelating receiver are independent of such variations.

While the above description has referred to the surfaces of the film as "top" and "bottom", these terms are merely labels to distinguish the two surfaces of the film.

While the above description of the embodiments of the present invention has referred to a "film", it is to be understood that the term film is intended to include sheets or webs.

Figure 7:
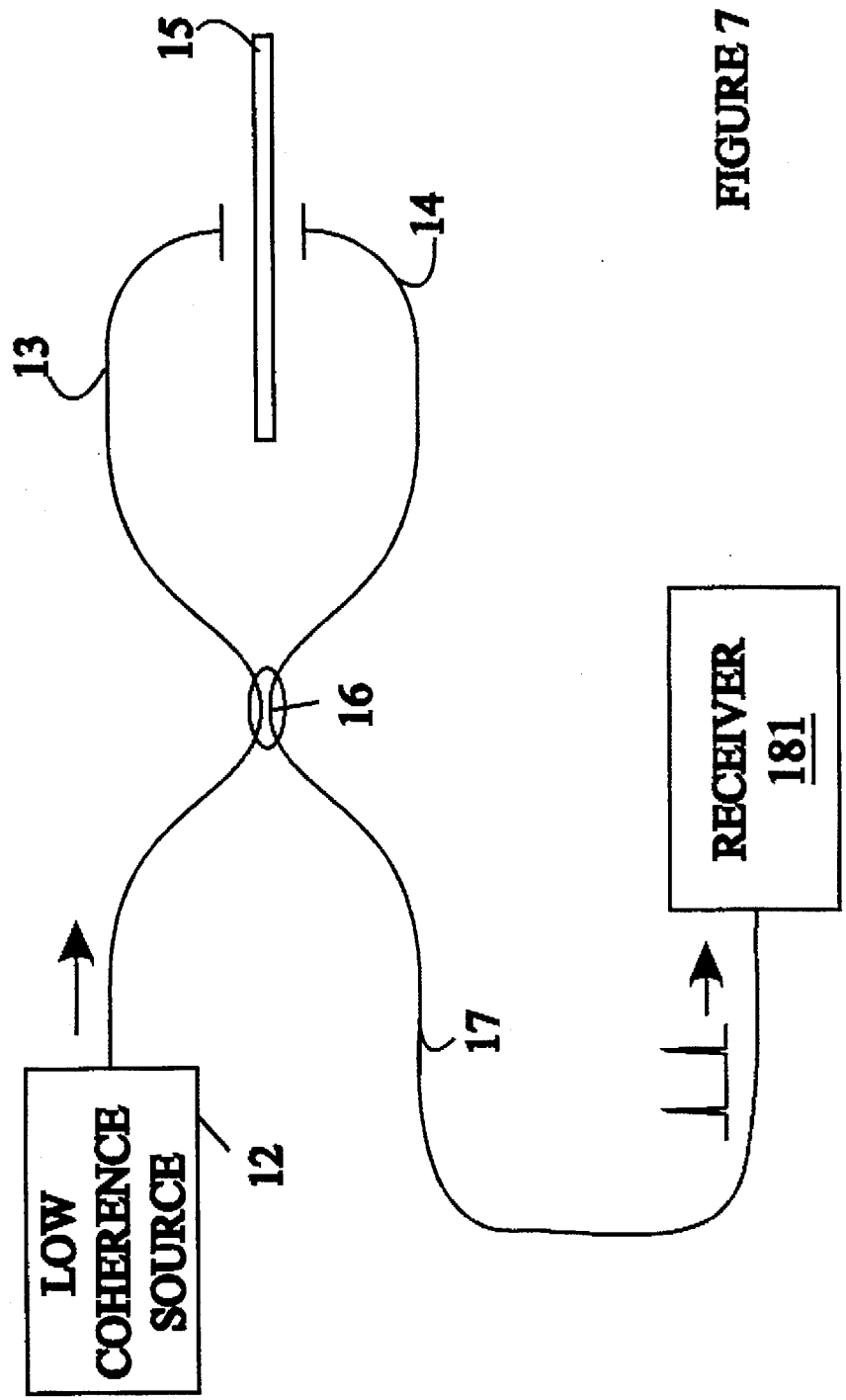
FIG. 7 is a schematic drawing of a more general embodiment of the present invention.

The above embodiments of the present invention have been described in terms of specific detectors such as an autocorrelator. In general, any receiver capable of determining the time delay between light reflected from the top and bottom surfaces of the film may be utilized. A generalized embodiment of the present invention utilizing a receiver 181 is shown in FIG. 7 at 200. Those elements of this embodiment that serve the same functions as elements shown in FIG. 1 have been given the same reference numerals. As noted above, receiver 181 may be constructed from autocorrelator, optical spectrum analyzer, or reflectometer.

Various modifications to the present invention will become apparent to those skilled in the art from the foregoing description and accompanying drawings. For example, a beam splitter could be substituted for the optical couplers shown at 16, 161, and 162. Also, light source 12 could be replaced by a xenon lamp or other low coherence light source. Accordingly, the present invention is to be limited solely by the scope of the following claims.

What is claimed is:

1. An apparatus for measuring the thickness of a film having top and bottom surfaces, said apparatus comprising:

means for generating a first probe light signal and a second probe light signal from a low coherence light source;

means for directing said first probe light signal toward said top surface of said film and for collecting light leaving said top surface of said film;

a top reference surface for partially reflecting light leaving said top surface of said film back toward said top surface of said film;

means for directing said second probe light signal toward said bottom surface of said film and for collecting light leaving said bottom surface of said film;

a bottom reference surface for partially reflecting light leaving said bottom surface of said film back toward said bottom surface of said film;

means for combining said light collected from said top and bottom surfaces of said film to form a collected light signal; and a receiver for receiving said collected light signal and for determining therefrom the time delay between light reflected from said top surface of said film and said top reference surface and from said bottom surface of said film and said bottom reference surface.

2. The apparatus of claim 1 wherein said receiver comprises an optical autocorrelator.

3. The apparatus of claim 1 wherein said receiver comprises an optical reflectometer.

4. The apparatus of claim 1 wherein said receiver comprises an optical spectrum analyzer.

5. The apparatus of claim 1 wherein said means for directing said first probe light signal toward said top surface of said film comprises an optical fiber and a first lens for directing light leaving said first optical fiber onto said film and for collecting light leaving said top surface of said film and said collected light into said first optical fiber.

6. The apparatus of claim 5 wherein said first lens comprises a surface between said lens and said top surface of said film, said surface reflecting a portion of any light leaving said film in a direction toward said surface back onto said film, said surface providing said top reference surface.

7. The apparatus of claim 1 wherein said means for directing said first probe light signal toward said top surface of said film comprises an optical fiber having a polished end, said polished end comprising said top reference surface.

8. The apparatus if claim 1 wherein said means for combining said collected light from said first and second surfaces of said film comprises an optical coupler.

9. The apparatus of claim 1 wherein said means for generating said first and second probe light signals and said means for combining said collected light signals from said first and second surfaces of said film comprise a single optical coupler.

10. A method for measuring the thickness of a film having top and bottom surfaces, said method comprising the steps of:

generating a first probe light signal and a second probe light signal from a low coherence light source;

directing said first probe light signal toward said top surface of said film and for collecting light leaving said top surface of said film;

providing a top reference surface for partially reflecting light leaving said top surface of said film back toward said top surface of said film;

directing said second probe light signal toward said bottom surface of said film and collecting light leaving said bottom surface of said film;

providing a bottom reference surface for partially reflecting light leaving said bottom surface of said film back toward said bottom surface of said film;

combining said light collected from said top and bottom surfaces of said film to form a collected light signal; and analyzing said collected light signal in a receiver to determine therefrom the time delay between light reflected from said top surface of said film and said top reference surface and from said bottom surface of said film and said bottom reference surface.

11. The method of claim 10 wherein said receiver comprises an optical autocorrelator.

12. The method of claim 10 wherein said receiver comprises an optical reflectometer.

13. The method of claim 10 wherein said receiver comprises an optical spectrum analyzer.

14. The method of claim 10 wherein said step of directing said first probe light signal toward said top surface of said film comprises providing an optical fiber and a first lens for directing light leaving said first optical fiber onto said film and for collecting light leaving said top surface of said film and said collected light into said first optical fiber.

15. The method of claim 14 wherein said first lens comprises a surface between said lens and said top surface of said film, said surface reflecting a portion of any light leaving said film in a direction toward said surface back onto said film, said surface providing said top reference surface.

16. The method of claim 10 wherein said step of directing said first probe light signal toward said top surface of said film comprises providing an optical fiber having a polished end, said polished end comprising said top reference surface.

17. The method of claim 10 wherein said step of combining said collected light from said first and second surfaces of said film comprises providing an optical coupler.

18. The method of claim 10 wherein said steps of generating said first and second probe light signals and combining said collected light signals from said first and second surfaces of said film comprises providing a single optical coupler.

* * * * *

UNITED STATES PATENT AND TRADEMARK OFFICE
CERTIFICATE OF CORRECTION

PATENT NO. : 5,642,196
DATED : June 24, 1997
INVENTOR(S) : Alves et al.

It is certified that error appears in the above-identified patent and that said Letters Patent is hereby corrected as shown below:

Column 1, line 61, "∝L", should read
-- $\Delta L$ --;

Column 1, line 62, "∝t", should read
-- $\Delta t$ --;

Column 1, line 63, "∝L=nc ∝t," should read
-- $\Delta L = c \Delta t / n$, --;

Column 2, line 24, "the medium" should read
-- a vacuum --;

Column 2, line 25, "a vacuum" should read
-- the medium --.

Signed and Sealed this

Eighth Day of May, 2001

*Attest:*

NICHOLAS P. GODICI

*Attesting Officer*     Acting Director of the United States Patent and Trademark Office